Oct. 3, 1939.  A. G. VON SODEN-FRAUNHOFEN  2,174,672
PLANET GEAR
Filed Nov. 6, 1937
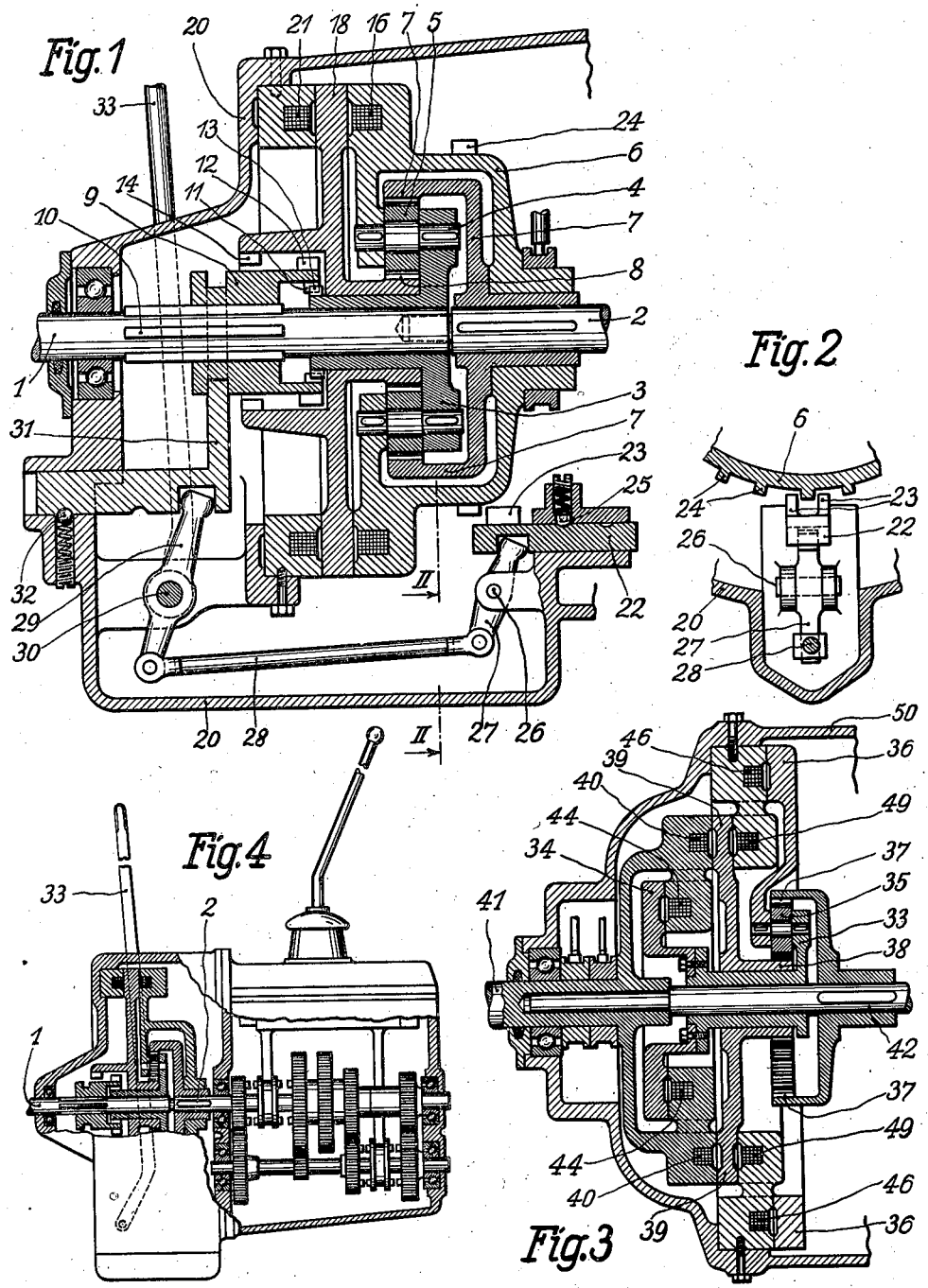
Inventor:
A. Graf von Soden-Fraunhofen
by S. Sokal, attorney Patented Oct. 3, 1939

2,174,672

UNITED STATES PATENT OFFICE 2,174,672

PLANET GEAR

Alfred Graf von Soden-Fraunhofen, Friedrichshafen-on-the-Bodensee, Germany, assignor to Zahnradfabrik Friedrichshafen Aktiengesellschaft, Friedrichshafen-on-the-Bodensee, Germany Application November 6, 1937, Serial No. 173,157
In Germany November 16, 1936

8 Claims. (Cl. 74—272)

An application has been filed in Germany on November 16, 1936.

The invention relates to a particular construction of planet gear which is suitable for combination with a change speed gear for power driven vehicles.

The essence of the invention consists in that disengageable clutch devices are provided between the driving shaft and the sun-wheel, between the driving shaft and the planet wheel carrier, and moreover between the sun wheel and the planet wheel carrier, and that means are provided which enable one to fix either the sun-wheel by itself or the planet wheel carrier by itself to a stationary casing.

This has the advantage that two forward speeds and one backward speed can be attained in a simple manner by means of the planet gear.

By the particular construction of the individual parts an extremely compact construction of the gear is moreover attained, which makes it particularly suitable for use with power driven vehicles, more particularly in combination with change speed gears used in power driven vehicles.

It has proved advantageous to use in connection with the gear mainly or even exclusively electromagnetic clutch and brake devices.

Constructional examples of the invention are illustrated in the accompanying drawing.

Fig. 1 shows a constructional form in vertical longitudinal section,

Fig. 2 is a partial section on line II—II (Fig. 1).

Fig. 3 shows in vertical longitudinal section a second constructional form by way of example.

Fig. 4 shows a gear according to Fig. 1 combined with a multi-speed gear of a power driven vehicle.

Of the coaxial shafts mounted one within the other, 1 is the driving shaft and 2 the driven shaft. Upon the driving shaft is first loosely mounted the planet wheel carrier 3. This contains axles 4 upon which are mounted the planet wheels 5. The planet wheel carrier is completed by a bell-shaped part 6 which is likewise loosely mounted. The connection of the parts 3 and 6 is effected by the axles 4. The planet wheels 5 engage with an outer wheel 7 which is fixed to the driven shaft. The sun wheel 8 is loosely mounted upon the hub of the planet wheel carrier 3. Between the driving shaft 1 and the sun-wheel 8 as well as between the driving shaft and the planet wheel carrier 3 are provided clutch devices. The clutching is effected by a control muff 9, longitudinally slidably guided upon the driving shaft 1 by means of feathers 10, which is provided on the one hand with a clutch toothed rim 11 and on the other hand with a clutch toothed rim 12. The toothed rim 11 fits into a corresponding toothed rim 13 of the planet wheel carrier 3 and the clutch toothed rim 12 fits into a toothed rim 14 of a disc-shaped body 18 which is integral with the sun wheel 8.

There is also a brake device which enables the sun wheel 8 to be fixed with regard to the stationary gear casing 20 and a brake device which enables the planet wheel carrier 3, 6 to be fixed with regard to the stationary casing. Moreover, there is also provided a clutch device by means of which the planet wheel carrier 3, 6 and the sun wheel 8 may be combined to form a unit. The part 18 of the sun wheel 8 suitably forms the disc between two electro-magnetic clutch and brake rims 16 and 21. The magnet rim 21 is fixed to the stationary casing 20 and the magnet rim 16 is mounted upon the planet wheel carrier 3, 6. In order to hold the planet wheel carrier 3, 6 stationary, a slide member 22 guided in the casing 20 is provided, which possesses a few teeth 23 which fit into a toothed rim 24 fixed to the part 6. For the slide member 22 there is provided a locking device 25 which serves for locking the member 22 in the one or in the other end position. For operating the slide member 22, a swing lever 27 mounted in the casing 20 by means of bolts 26 may be provided, which is advantageously connected by a link 28 to a lever 29 which latter swings about the fixed bolt 30 and engages the fork 31 of the control muff 9. The fork 31 is guided in the casing 20 and the two end positions of its displacement can be secured by a locking device 32.

With a lever 29 or its bolt 30 is connected a suitable operating lever 33 which is preferably mounted outside upon the casing.

The mode of operation of the planet gear illustrated in Figs. 1 and 2 is the following:

If only the electromagnetic rim 16 is supplied with current, the sun wheel 8 and the planet wheel carrier 3, 6 are clutched together. If the clutch muff 9 as shown in Fig. 1, then engages with its clutch rim 11 the clutch rim 13 of the planet wheel carrier 3, 6, drive will be effected simultaneously from the shaft 1 via clutch muff 9 of the planet wheel carrier 3, 6 and the sun wheel 8. This results in the driven shaft 2 being simultaneously rotated via planet gear 8, 5, 7 with the same speed as that of the driving shaft 1.

If it is desired to let the driven shaft run with a high speed, the planet wheel carrier 3, 6 is driven, whilst retaining the position of the control muff 9 shown in Fig. 1, and supplying only the electromagnetic rim 21 with current. This results in the fixing of the sun wheel 8 with regard to the stationary casing 20, and in the carrying of the planet wheel carrier 3, 6 by the driving shaft 1, whereby the driven shaft 2 receives a higher speed than the driving shaft 1.

On leaving the two electromagnetic rims 16 and 21 free of current, and on displacing the control muff 9 from the position shown in Fig. 1 leftwards, so that its clutch rim 12 comes into engagement with the clutch rim 14 of the sun wheel 8, the planet wheel carrier 3, 6 will be simultaneously fixed with regard to the stationary casing 20 due to the connection of the slide member 22 with the fork 31 of the control muff 9 and the engagement of the teeth 23 with the clutch rim 24 of the planet wheel carrier 3, 6. This will then produce drive of the sun wheel 8 from the driving shaft 1 via the control muff 9, whilst the planet wheel carrier 3, 6 stands still. The outer wheel 7 which is fast upon the driven shaft 2 must then rotate rearwards with regard to the driving shaft 1, and consequently backward rotation of the driven shaft 2 is attained.

In the constructional form according to Fig. 3, electromagnetic clutches and brakes are exclusively used. The planet wheel carrier consists of the part 33 loosely mounted upon the driven shaft 42, to which are connected on the one side a disc 34 and on the other side a disc 36. Upon the hub of the planet wheel carrier is loosely mounted the sun wheel 38 which carries laterally the disc 39. With regard to the discs 34, 36 and 39 there are provided corresponding electromagnetic rims, namely, the electromagnetic rim 44 fixed to the driving shaft 41 which is opposite the disc 34 of the planet wheel carrier 33, and moreover the driving shaft 41 has the electromagnetic rim 40 which is located at one side of the disc 39 of the sun wheel 38. The stationary casing 50 carries two electromagnetic rims, namely the rim 49 corresponding to the disc 39 of the sun wheel 38, and the electromagnetic rim 46 corresponding to the disc 36 of the planet wheel carrier 33. The outer wheel of the planet gear is designated by the numeral 37. It is fixedly mounted upon the driven shaft 42.

The mode of operation of the gear illustrated in Fig. 3 is the following:

If the electromagnetic rims 44 and 40 are supplied with current, the driving shaft 41 is clutched on the one hand with the planet wheel carrier 33 by means of the disc 34, and on the other hand with the sun wheel 38 by means of the disc 39. The sun wheel and the planet wheel carrier therefore both rotate with the driving shaft and consequently the same speed of rotation will result in the outer wheel and in the driven shaft 42 as in the driving shaft 41.

If, on the other hand, the electromagnetic rims 44 and 49 are both supplied with current, the planet wheel carrier 33 will be clutched with the driving shaft 41 by means of disc 34, and on the other hand the sun wheel 38 will be fixed with regard to the stationary engine casing 50 by means of the disc 39. This will produce in the driven shaft 42 a higher speed of revolution than that of the driving shaft 41, dependent on the relative dimensions of the wheels of the planet gear with regard to each other.

In order to effect backward running of the driven shaft 42 electromagnetic rims 40 and 46 are supplied with current. This produces clutching of the sun wheel 38 with the driving shaft 41 by means of the disc 39, and fixing of the planet wheel carrier 33 with regard to the gear casing 50 by means of the disc 36.

If the planet gear according to the invention is combined with a multi-speed toothed wheel change speed gear of a power driven vehicle, the connection is advantageously effected at the front of the gear so that the driving shaft of the planet gear is connected to the driving shaft of the motor, and the driven shaft of the planet gear leads into the power vehicle gear proper. In this case of application, it is possible to attain by the aid of the upward transmission produced by the planet gear, in addition to the forward speeds attainable by means of the power vehicle gear per se, as many forward speeds again, but according to the invention, the transmission within the planet gear is so chosen that in each case by means of the employment of the individual forward speeds of the power vehicle gear, an intermediate speed is attained, that is, the ultimately attained transmission ratios shall not be identical with the transmission ratios of the power vehicle gear. An example of the planet gear according to the invention with a multi-speed toothed wheel change speed gear of a power driven vehicle is shown in Fig. 4.

I claim:

1. In a planet gear, the combination of: a stationary casing; a driving shaft; a driven shaft; a sun wheel loosely mounted with regard to said driving shaft; a planet wheel carrier with planet wheels co-operating with said sun wheel, said carrier being loosely mounted with regard to said driving shaft; an outer wheel co-operating with said planet wheels and fixedly mounted upon the driven shaft; disengaging clutch means between said driving shaft and said sun wheel; disengaging clutch means between said driving shaft and said planet wheel carrier; disengaging clutch means between said sun wheel and said planet wheel carrier; disengaging brake means between said sun wheel and said stationary casing; disengaging brake means between said planet wheel carrier and said stationary casing; and means for controlling such disengaging clutch and brake means, whereby rotation may be transmitted from the driving shaft to the driven shaft either without change of speed, the driving shaft, sun wheel, planet wheel carrier and outer wheel rotating as a whole, or with an increased speed, the sun wheel being fixed to the casing and the planet wheel carrier being clutched to the driving shaft, or with a reverse speed, the sun wheel being clutched to the driving shaft and the planet wheel carrier being fixed to the casing.

2. In a planet gear, the combination of: a stationary casing; a driving shaft; a driven shaft coaxial with said driving shaft; a sun wheel loosely mounted with regard to said driving shaft; a planet wheel carrier with planet wheels engaging said sun wheel, said planet wheel carrier being loosely mounted with regard to said driving shaft; an outer wheel engaging said planet wheels, said outer wheel being fixedly mounted upon said driven shaft; mechanical clutch means associated with said driving shaft for selectively clutching said driving shaft either to said sun wheel or to said planet wheel carrier; disengaging brake means for fixing said sun wheel to said casing; disengaging brake means for fixing said planet wheel carrier to said casing; and disengaging clutch means for clutching said sun wheel to said planet wheel carrier, whereby rotation may be transmitted from the driving shaft to the driven shaft without change of speed by clutching the sun wheel to the driving shaft and clutching the planet wheel carrier to the sun wheel, or with an increased speed by clutching the planet wheel carrier to the driving shaft and by fixing the sun wheel to the casing, or with reverse speed by fixing the planet wheel carrier to the casing and clutching the sun wheel to the driving shaft.

3. In a planet gear the combination of: a stationary casing; a driving shaft; a driven shaft coaxial therewith; a sun wheel loosely mounted with regard to said driving shaft; a planet wheel carrier with planet wheels engaging said sun wheel, said carrier being loosely mounted with regard to said driving shaft; an outer wheel engaging with said planet wheels and fixedly mounted upon the driven shaft; electromagnetic clutch means for clutching said sun wheel to said driving shaft; electromagnetic clutch means for clutching said planet wheel carrier to said driving shaft; electromagnetic brake means for fixing said sun wheel to said casing; electromagnetic brake means for fixing said planet wheel carrier to said casing; and electromagnetic clutch means for clutching said sun wheel to said planet wheel carrier, whereby rotation may be transmitted from the driving shaft to the driven shaft either without change of speed, or with an increased speed by clutching the planet wheel carrier to the driving shaft and fixing the sun wheel to the casing, or with a reverse speed by fixing the planet wheel carrier to the casing and clutching the sun wheel to the driving shaft.

4. In a planet gear the combination of: a stationary casing; a driving shaft; a driven shaft coaxial therewith; a sun wheel loosely mounted with regard to said driving shaft; a planet wheel carrier with planet wheels engaging said sun wheel, said carrier being loosely mounted with regard to said driving shaft; an outer wheel engaging said planet wheels, said outer wheel being fixed to said driven shaft, said sun wheel being provided with a claw clutch member; said planet wheel carrier being provided with a claw clutch member and being also provided with a claw member; a member having a claw clutch member cooperating with the claw clutch member of said sun wheel, and also having a second claw clutch member co-operating with the claw clutch member of said carrier, said member being slidable on and rotatable with said driving shaft; a brake member slidable in said casing and adapted to co-operate with the second mentioned claw member of the carrier; means for fixing said sun wheel with respect to the casing; means for clutching said carrier to said sun wheel; and means for simultaneously operating the clutch members slidable upon the shaft and the brake member slidable in the casing, whereby rotation can be transmitted from the driving shaft to the driven shaft either with the same speed or with an increased speed or with a reverse speed, substantially as described.

5. In a planet gear, more particularly for use on power driven vehicles, the combination of: a stationary casing; a driving shaft; a driven shaft coaxial with said driving shaft; a sun wheel loosely mounted with regard to said driving shaft; a planet wheel carrier with planet wheels engaging said sun wheel, said carrier being loosely mounted with regard to said driving shaft; an outer wheel engaging said planet wheels, said outer wheel being fixedly mounted on said driven shaft; a clutch member slidable on and rotatable with said driving shaft, said clutch member having a first set of claws and a second set of claws; a brake member slidable in said stationary casing and provided with claws; a common operating member for controlling simultaneously the clutch member slidable on the driving shaft and the brake member slidable in the casing; a claw clutch member upon said planet wheel carrier, adapted to co-operate with the first set of claws of the clutch member slidable on the shaft; clutch claws upon said sun wheel adapted to co-operate with the second set of claws upon said sliding clutch member, and claws upon said planet wheel carrier adapted to co-operate with the brake member slidable in the casing, whereby either the sun wheel or the planet wheel carrier may be selectively clutched to the driving shaft and either the sun wheel or the planet wheel carrier may be fixed with respect to the stationary casing.

6. In a planet gear, the combination of: a stationary casing; a driving shaft; a driven shaft coaxial with said driving shaft; a sun wheel loosely mounted with regard to said driving shaft, said sun wheel having a set of clutch claws; an electro-magnetic brake for fixing said sun wheel to said stationary casing; a planet wheel carrier with planet wheels engaging said sun wheel, said planet wheel carrier being loosely mounted with regard to said driving shaft and being provided with a set of clutch claws for clutching to the driving shaft and being also provided with a set of claws for fixing said carrier with respect to said stationary casing; an electromagnetic clutch for clutching said planet wheel carrier to said sun wheel; a slidable clutch member rotatable with said driving shaft having a set of claws co-operating with the first set of claws of the carrier, and having also claws adapted to co-operate with the claws of the sun wheel; a claw brake member adapted to co-operate with the second set of claws of the carrier and slidable in said casing; and means for simultaneously operating the sliding clutch member mounted upon the driving shaft and the sliding brake member mounted in the casing, whereby rotation may be transmitted from the driving shaft to the driven shaft either with the same speed or with an increased speed or with a reverse speed, by suitably clutching either the sun wheel or the planet wheel carrier to the driving shaft and fixing either the sun wheel or the planet wheel carrier with regard to the casing, substantially as described.

7. In a planet gear, the combination of: a stationary casing; a driving shaft; a driven shaft coaxial with said driving shaft; a sun wheel loosely mounted with regard to said driving shaft, said sun wheel having a set of clutch claws; an electromagnetic brake for fixing said sun wheel to said stationary casing; a planet wheel carrier with planet wheels engaging said sun wheel, said planet wheel carrier being loosely mounted with regard to said driving shaft and being provided with a set of clutch claws for clutching to the driving shaft and being also provided with a set of claws for fixing said carrier with respect to said stationary casing; an electromagnetic clutch for clutching said planet wheel carrier to said sun wheel; a slidable clutch member rotatable with said driving shaft having a set of claws co-operating with the clutch claws of the carrier, and having also claws adapted to co-operate with the claws of the sun wheel; a claw brake member adapted to co-operate with the second set of claws of the carrier and slidable in said casing; means for simultaneously operating the sliding clutch member mounted upon the driving shaft and the sliding brake member mounted in the casing; and means for locking said operating means in the two extreme positions, whereby rotation may be transmitted from the driving shaft to the driven shaft either with the same speed or with an increased speed or with a reverse speed, by suitably clutching either the sun wheel or the planet wheel carrier to the driving shaft and fixing either the sun wheel or the planet wheel carrier with regard to the casing, substantially as described.

8. In a planet gear, the combination of: a stationary casing; a driving shaft; a driven shaft coaxial with said driving shaft; a sun wheel loosely mounted with regard to one of the said two shafts; a planet wheel carrier with planet wheels engaging said sun wheel, said carrier being loosely mounted with regard to the same shaft as the sun wheel; an outer wheel engaging said planet wheels and fixedly mounted on the other shaft; means for clutching said sun wheel and said planet wheel carrier to the shaft with regard to which they are loosely mounted, upon actuation of which means rotation can be transmitted from one shaft to the other shaft without change of speed; means for clutching the sun wheel to the shaft with regard to which the sun wheel is loosely mounted and simultaneously fixing the planet wheel carrier to the stationary casing, upon actuation of which means rotation is transmitted from one shaft to the other in the reverse direction; and means for fixing the sun wheel to the stationary casing and simultaneously clutching the planet wheel carrier to the shaft with regard to which the carrier is loosely mounted, upon the actuation of which means rotation is transmitted with an increased speed.

ALFRED GRAF v. SODEN-FRAUNHOFEN.